(12) United States Patent
Glazberg et al.

(10) Patent No.: US 7,990,980 B2
(45) Date of Patent: Aug. 2, 2011

(54) MODELING NON-DETERMINISTIC PRIORITY QUEUES FOR EFFICIENT MODEL CHECKING

(75) Inventors: Ziv Glazberg, Jerusalem (IL); Janees Elamkulam, Nilambur (IN); Satish Chandra Gupta, Bangalore (IN); Sandeep Kohli, Bangalore (IN); Ishai Rabinovitz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/965,408

(22) Filed: Dec. 27, 2007

(65) Prior Publication Data

US 2009/0168785 A1   Jul. 2, 2009

(51) Int. Cl.
    *H04L 12/56* (2006.01)
(52) U.S. Cl. ............... 370/395.4; 370/401; 370/414
(58) Field of Classification Search ............... None
    See application file for complete search history.

(56) References Cited

U.S. PATENT DOCUMENTS

| | | | | |
|---|---|---|---|---|
| 5,790,522 A * | 8/1998 | Fichou et al. | ............... | 370/413 |
| 6,011,779 A * | 1/2000 | Wills | ............... | 370/413 |
| 6,108,307 A * | 8/2000 | McConnell et al. | ............... | 370/412 |
| 6,188,698 B1 * | 2/2001 | Galand et al. | ............... | 370/412 |
| 6,975,683 B2 | 12/2005 | Chen et al. | | |
| 2003/0004926 A1 | 1/2003 | Ben-David | | |
| 2003/0149814 A1 | 8/2003 | Burns et al. | | |
| 2004/0123254 A1 | 6/2004 | Geist et al. | | |
| 2004/0213251 A1 * | 10/2004 | Tran et al. | ............... | 370/412 |
| 2005/0058149 A1 | 3/2005 | Howe | | |
| 2005/0097146 A1 * | 5/2005 | Konstantinou et al. | ............... | 707/200 |
| 2006/0130007 A1 | 6/2006 | Ackerman | | |
| 2007/0297435 A1 * | 12/2007 | Bucknell et al. | ............... | 370/412 |
| 2008/0010444 A1 * | 1/2008 | Hammes | ............... | 712/241 |

FOREIGN PATENT DOCUMENTS

WO   WO 2006051465 A1 *   5/2006

OTHER PUBLICATIONS

Vasudevan, S. et al., "Static Program Transformations for Efficient Software Model Checking," pp. 1-25.

* cited by examiner

*Primary Examiner* — Chirag G Shah
*Assistant Examiner* — Joshua Smith
(74) *Attorney, Agent, or Firm* — Hamilton, Brook, Smith & Reynolds, P.C.

(57) ABSTRACT

A method and system are disclosed for modeling non-deterministic queues for efficient model checking. In this method and system, a multitude of messages are held in a plurality of queues, and these messages having n priorities. The method comprises the steps of providing (n+1) queues, including a first queue, and n priority queues; passing said messages from a source to the first queue; passing each of said messages from the first queue to one of said n priority queues based on the priority of the message; and passing each of said messages from the n priority queues to a destination based on the priority of the message. One or more non-deterministic waits are introduced into one or more of the passing steps to simplify passing the messages into or out of the n priority queues.

16 Claims, 7 Drawing Sheets

FIG. 1

MODEL FOR PRIORY QUEUE WITH 3 PRIORITIES

MODELING NON-DETERMINISTIC PRIORITY QUEUES FOR EFFICIENT MODEL CHECKING

FIELD OF THE INVENTION

The present invention generally relates to design verification, and more specifically to the use of model checking to verify that the design of a device holds certain correctness properties. Even more specifically, the preferred embodiment of the invention relates to a model checking technique that is very well suited for use with embedded processing devices.

BACKGROUND OF THE INVENTION

Embedded devices are becoming pervasive and playing increasing role in our lives. We depend on cell phones and ATMs. Embedded systems are also used in mission critical applications such as aircraft navigation and control systems, heart pacemaker devices, and military systems. Correct functioning of these devices is crucial. To establish correctness, subjecting them to various possible inputs tests these devices. However, exhaustive testing is not only costly and time consuming but also impossible for non-trivial devices. A complementary approach is to apply static model checking techniques to verify that the design of a device holds certain correctness properties.

Model Checking is used to establish correctness of a given program. Model Checking techniques typically convert program constructs in a program into equivalent mathematical logic or constructs. These mathematical constructs collectively define the underlying mathematical model of the program. In essence, the mathematical model defines the various states a given program can be in, and the conditions (inputs) required for various state transitions.

The correctness is established by exploring the state space of the mathematical model and verifying that none of the execution paths will lead to a program state that violates one or more constraints from a pre-defined constraint set.

Evidently, the correctness proof of a program with any Model Checking technique is based on the assumption that the translation of a program to a mathematical model is flawless. If the translation is incorrect, then the correctness proof is unreliable. That is why it is very important that the translation is correct without a doubt.

Model Checking techniques are very useful in embedded devices that have real-time software. In such devices, all possible inputs cannot be tested, but the correctness of software is vital because these devices have critical applications such as health and military applications. Real time systems are concurrent reactive systems represented by communicating state machines. The communication channels between state machines are defined using Priority Message Queue programming construct.

The embedded devices fall into the category of concurrent reactive systems and their design can be expressed through Unified Modeling Language (UML) state machines communicating with each other through signal and message passing. For static model checking, the UML state machines have to be converted into modeling languages suitable for model checking. A challenging aspect of the conversion is efficient modeling of communication channels between the state machines. This aspect is difficult because the scalability of model checking techniques is limited due to the problem of state space explosion. A channel is essentially a non-deterministic priority message queue. The model should be expressive enough to capture the behavior of a non-deterministic priority queue, yet the possible permutations should occupy small state space.

Existing techniques to model priority queues typically have a single queue, and allow each cell to swap its content with the cell before it depending upon the different priorities of the cells. Though this model is concise (i.e. less bits to model), the behavior is complex (i.e. model of each bit is complex). For symbolic model checking, the behavior needs to be encoded into a representation suitable for model checking (such as SAT (Satisfiability problem) or BDD (Binary Decision Diagram)). Complex behavior results in bigger encoding. Therefore, the complexity of the behavior is an important issue for performing model checking.

SUMMARY OF THE INVENTION

An object of the present invention is to improve model-checking techniques.

Another object of this invention is to model non-deterministic queues for efficient model checking.

A further object of the invention is to facilitate expressing complex behavior of priority queues in a simple and intuitive manner.

These and other objectives are attained with a method and system for modeling non-deterministic queues for efficient model checking. In this method and system, a multitude of messages are held in a plurality of queues. These messages have n priorities, and the method comprises the step of providing (n+1) queues, including a first queue, and n priority queues. The method comprises the further steps of passing said messages from a source to the first queue; passing each of said messages from the first queue to one of said n priority queues based on the priority of the message; and passing each of said messages from the n queues to a destination based on the priority of the message. One or more non-deterministic waits are introduced into one or more of the passing steps to simplify passing the messages into or out of the n priority queues in a preferred or predetermined manner.

For example, a non-deterministic wait may be introduced between the first queue and said n priority queues to control the timing of the passing of messages into the first queue. In addition, or as an alternative, a non-deterministic wait may be introduced between the n priority queues and the destination to control the timing of the passing of messages from the n priority queues to the destination.

In the preferred embodiment of the invention, non-deterministic behavior is simulated using a non-deterministic wait at various stages. Since it has a larger number of queues in comparison to the single queue model, this preferred technique takes more space (i.e. more bits to model). But the behavior is very simple (i.e. the model of each bit is simple). This technique facilitates expressing complex behavior of a priority queue in a simple and intuitive manner, which is closer to the system being modeled, and hence leads to a compact representation to allow efficient model checking.

Existing methods use a single queue, whose logic is very complex, and hence has significant potential for errors, which jeopardizes the correctness of model checking and renders it useless. The method described herein uses (n+1) queues, where n is the number of priorities. For example, if there are three types of priorities—such as low, medium and high—that a message (from a state machine to another state machine) can have, then this method will use four queues instead of one queue, as done by existing methods. This greatly simplifies the translation and eliminates the risk of mistake while translating communication channels to equivalent mathematical models. An important advantage of this invention is in the great amount of simplification (and hence correctness) achieved in the logic and translation by using (n+1) queues. The invention is particularly useful in the critical role of accurate translation of communication channels to respective mathematical models in Model Checking real time software correctly.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
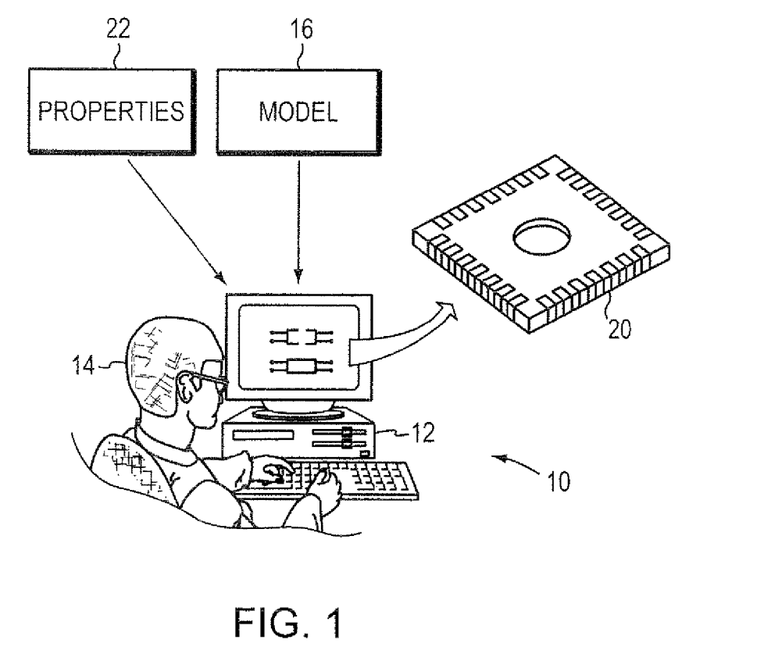
FIG. 1 is a schematic pictorial illustration showing a system for modeling priority queues in accordance with a preferred embodiment of the present invention.

FIG. 1 is a schematic pictorial illustration of a system 10 for model checking, in accordance with a preferred embodiment of the present invention. System 10 typically comprises a model processor 12, typically a general-purpose computer workstation running suitable model checking software. The system is operated by a user 14, which may be a design or verification engineer. The model checking software may be downloaded to processor 12 in electronic form, over a network, for example, or it may be supplied on tangible media, such as CD-ROM or non-volatile memory. Processor 12 receives a hardware implementation model 16 of a target system or device 20 in development, which may refer to the entire system or device or to a sub-unit, such as a circuit or functional block. User 14 prepares a path specification 22, comprising properties for use in model checking of model 16, and selects initial states of the model. System 10 analyzes the model to find full or partial traces between the initial states and target states, which are inferred by processor 12 based on the path specification. The methods described below in detail are used in this model analysis.

As indicated above, when modeling embedded devices, and other concurrent reactive systems, their designs can be expressed through UML state machines communicating with each other through signal and message passing. For static model checking, the UML state machines have to be converted into modeling languages suitable for model checking. An important aspect of the conversion is efficient modeling of communication channels between the state machines because the scalability of model checking techniques is limited due to the problem of state space explosion. A channel is essentially a non-deterministic priority message queue. The model should be expressive enough to capture the behavior of a non-deterministic priority queue yet the possible permutations should occupy small state space. The present invention provides a technique to model non-deterministic queues for efficient model checking.

Generally, a communication channel provides the following guarantee: given two messages m1 and m2, m1 is guaranteed to be processed before m2, if m1 has arrived before m2 and m2's priority is the same as or lower than the priority of m1. Otherwise, the processing order is non-deterministic.

Figure 2:
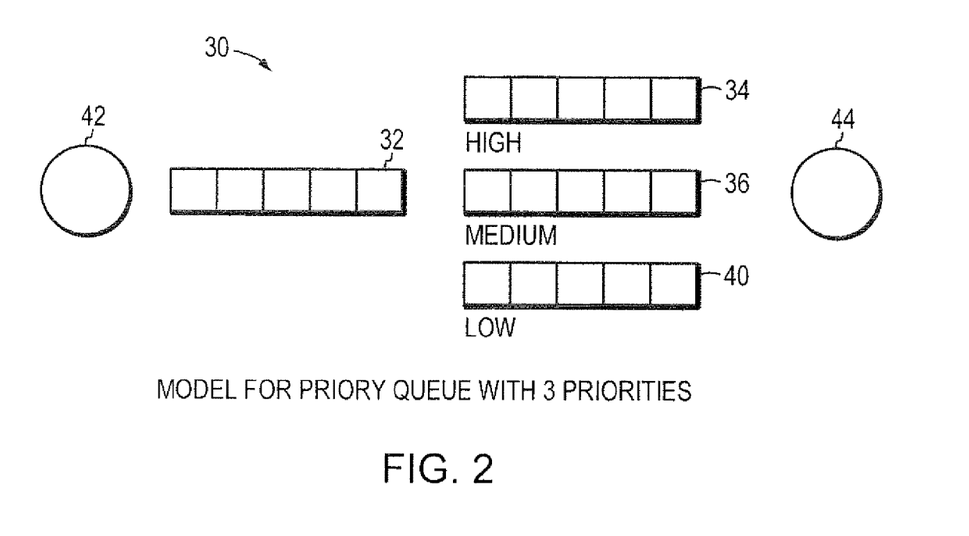
FIG. 2 illustrates an example model for priority queues with three priorities.

FIG. 2 illustrates an efficient model 30 for this behavior in accordance with one embodiment of this invention. The model uses (n+1) queues for n priorities. The example shown in FIG. 2 includes a first queue 32 and three priority queues 34, 36 and 40. Queue 34 is a high priority queue, queue 36 is a medium priority queue, and queue 40 is a low priority queue. FIG. 2 also shows a message source 42 and a message destination 44.

The first queue 32 gets messages, which are then passed to the correct priority queue. The first message available in the non-empty priority queue with the highest priority gets processed first. The nondeterministic behavior is achieved by introducing nondeterministic waits between first queue 32 and the queues 34, 36, 40 for the different priorities, and between the queues 34, 36, 40 for priorities and destination process 44. The non-deterministic wait between the first queue 32 and the queues 34, 36, 40 for the priorities allows the destination process 44 to look at lower priority messages before a high priority message enters the high priority queue 34. The non-deterministic wait between the queues 34, 36, 40 for priorities and the destination process 44 allows the destination process to look at higher priority messages before early low priority message.

Figure 3A:
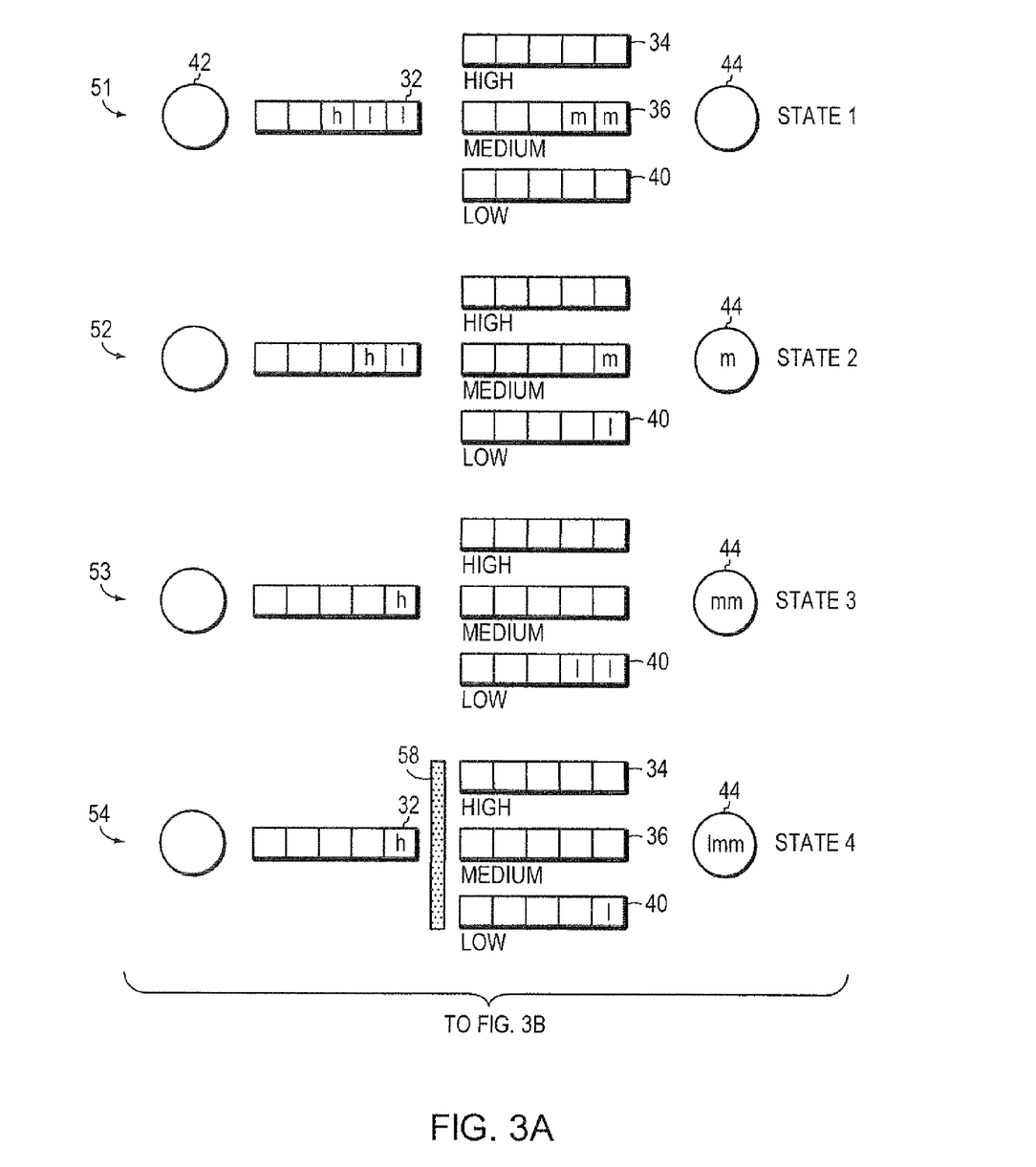
FIG. 3A and FIG. 3B show a first example of the present invention.
Figure 3B:
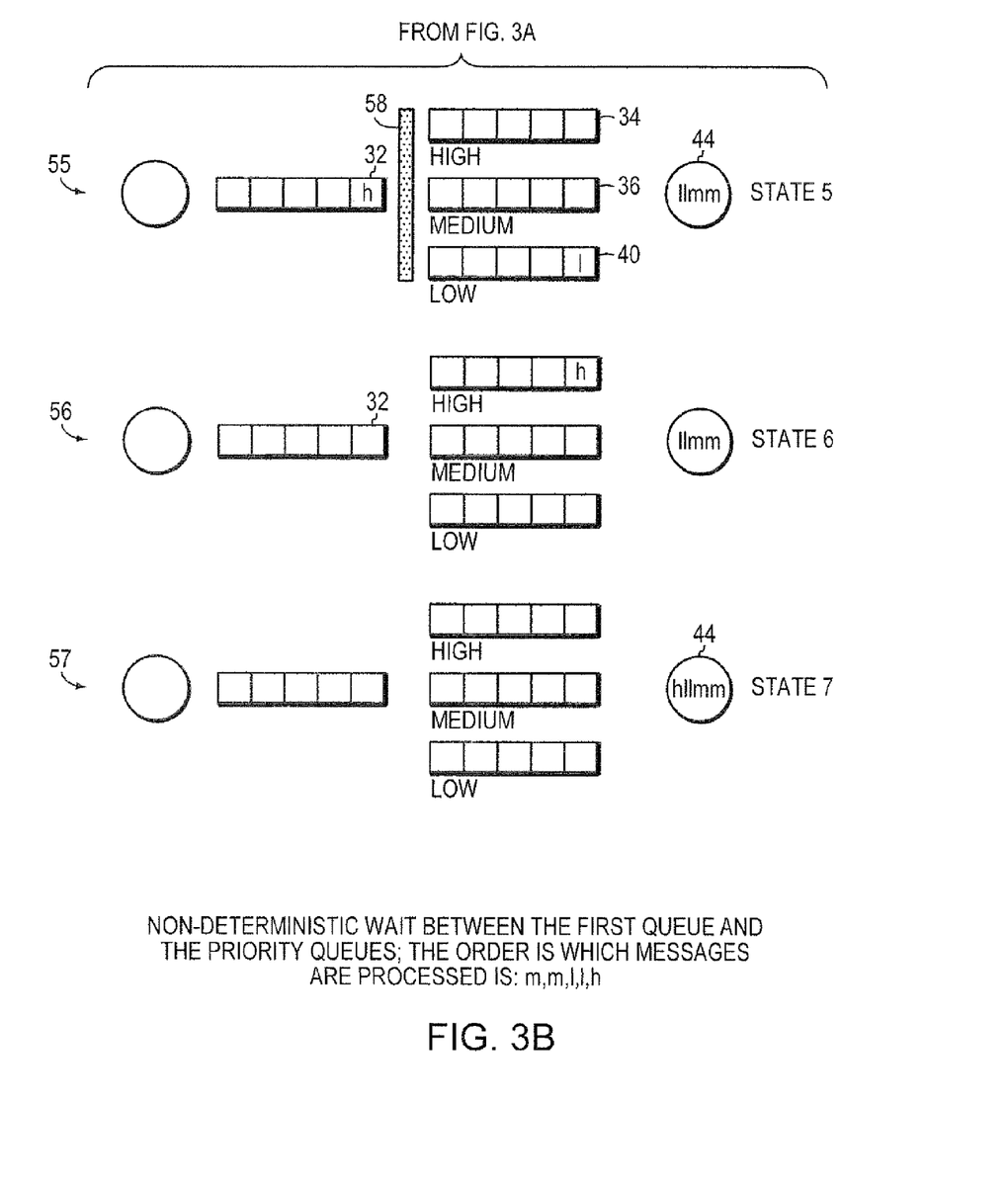
Figure 4A:
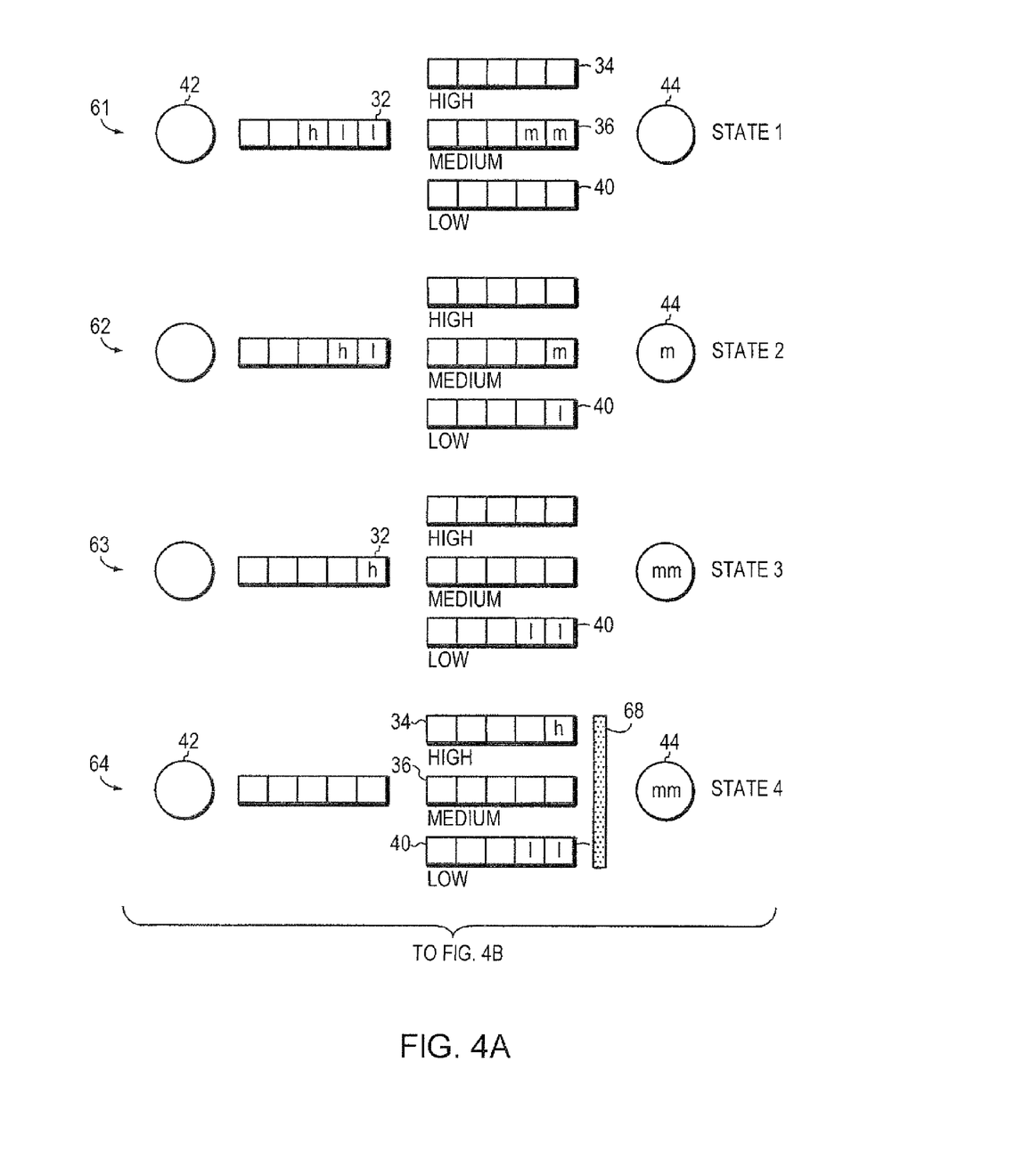
FIG. 4A and FIG. 4B show a second example of the preferred embodiment of this invention.
Figure 4B:
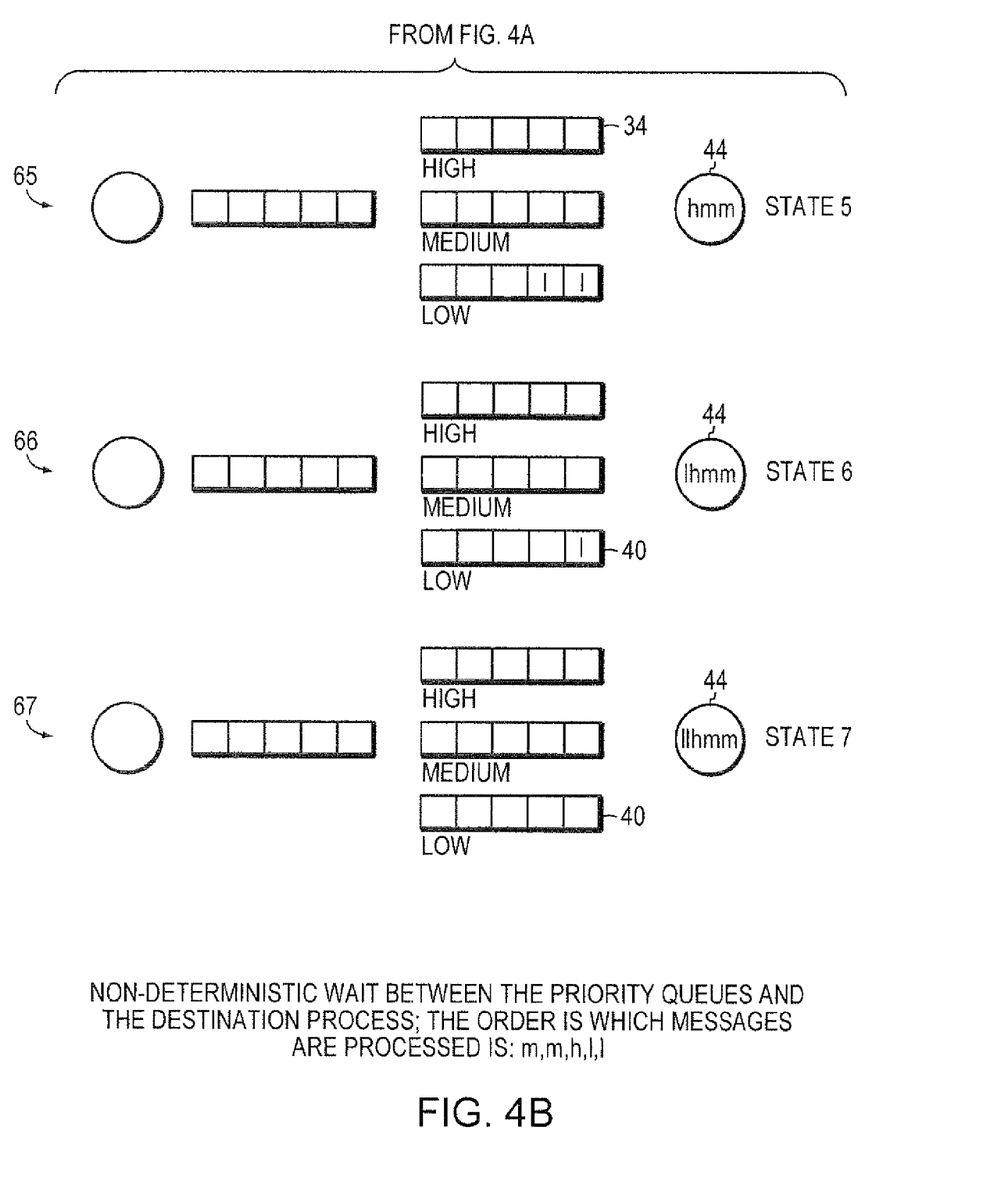

These features of the invention are illustrated in FIGS. 3A, 3B, 4A and 4B. More specifically, FIG. 3A and FIG. 3B illustrate the results of the use of the non-deterministic wait between the first queue 32 and the queues 34, 36, 40 for the priorities, and FIG. 4A and FIG. 4B show the results of the use of the non-deterministic wait between the queues 34, 36, 40 for the priorities and the destination process 44.

FIG. 3A and FIG. 3B illustrate seven states, 51-57. At state 51 (State 1), messages "m" and "m" are in the medium priority queue 36, and messages "h", "l" and "l" are in the first queue 32. At state 52 (State 2), the first "m" message is sent to the destination 44, and the first "l" message is sent to low priority queue 40. At state 53 (State 3), the second "m" message is sent to the destination 44, and the second "l" message is sent to the low priority queue 40.

At states 54 and 55 (States 4 and 5), a non-deterministic wait, represented at 58, occurs between the first queue 32 and the priority queues 34, 36, 40. This wait allows the two low priority messages to be sent to the destination 44 before the high priority message in queue 32 is passed to the high priority queue 34. At states 56 and 57 (States 6 and 7), this high priority message is sent to queue 34 and then to the destination 44. Thus, with the procedure of FIG. 3A and FIG. 3B, as indicated at state 57, the order in which the messages are processed is "m", "m", "l", "l", "h".

FIG. 4A and FIG. 4B also show seven states 61-67. Similar to the process depicted in FIG. 3A and FIG. 3B, at state 61, messages "m" and "m" are in the medium priority queue 36, and messages "h", "l" and "l" are in the first queue 32. At state 62, the first "m" message is sent to the destination 44, and the first "l" message is sent to low priority queue 40. At state 63, the second "m" message is sent to the destination 44, and the second "l" message is sent to the low priority queue 40.

At state 64, a non-deterministic wait, represented at 68, is introduced between the priority queues 34, 36, 40 and the destination 44. This wait allows the high priority message h to be passed from queue 32 to high priority queue 34 before the low priority messages are passed from the low priority queue 40 to the destination 44. Then, at state 65, the high priority message h is passed from queue 34 to the destination 44; and at states 66 and 67, the low priority messages are passed from the low priority queue 40 to the destination 44. Thus, with this procedure of FIG. 4A and FIG. 4B, as indicated in state 67, the order in which the messages are processed is "m", "m", "h", "l", "l".

The preferred mechanism of the present invention allows also that the high priority message may be handled between two low priority messages that came earlier. For example, if there is no wait, as would be the case in standard priority queue model, the order in which messages are processed is "m", "m", "l", "h", "l".

Figure 5A:
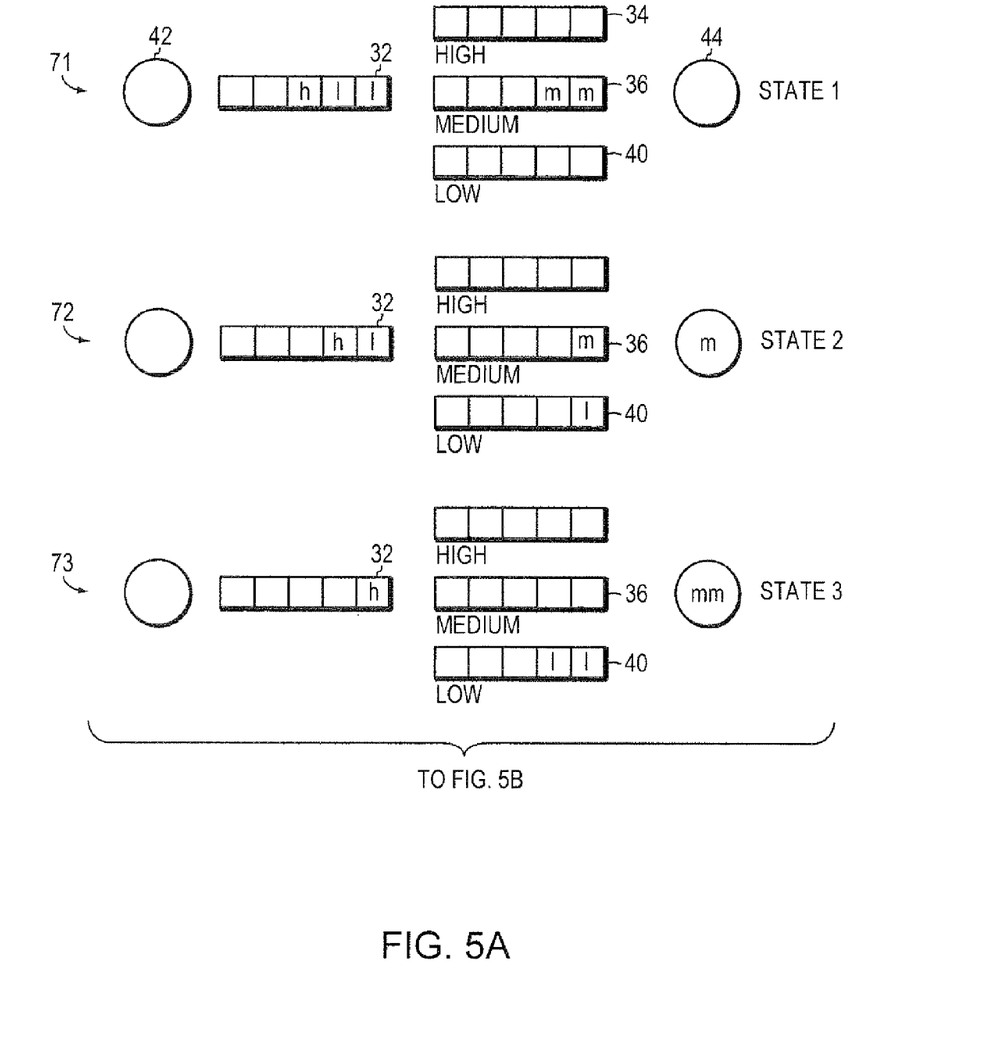
FIG. 5A and FIG. 5B illustrate a third example of the present invention.
Figure 5B:
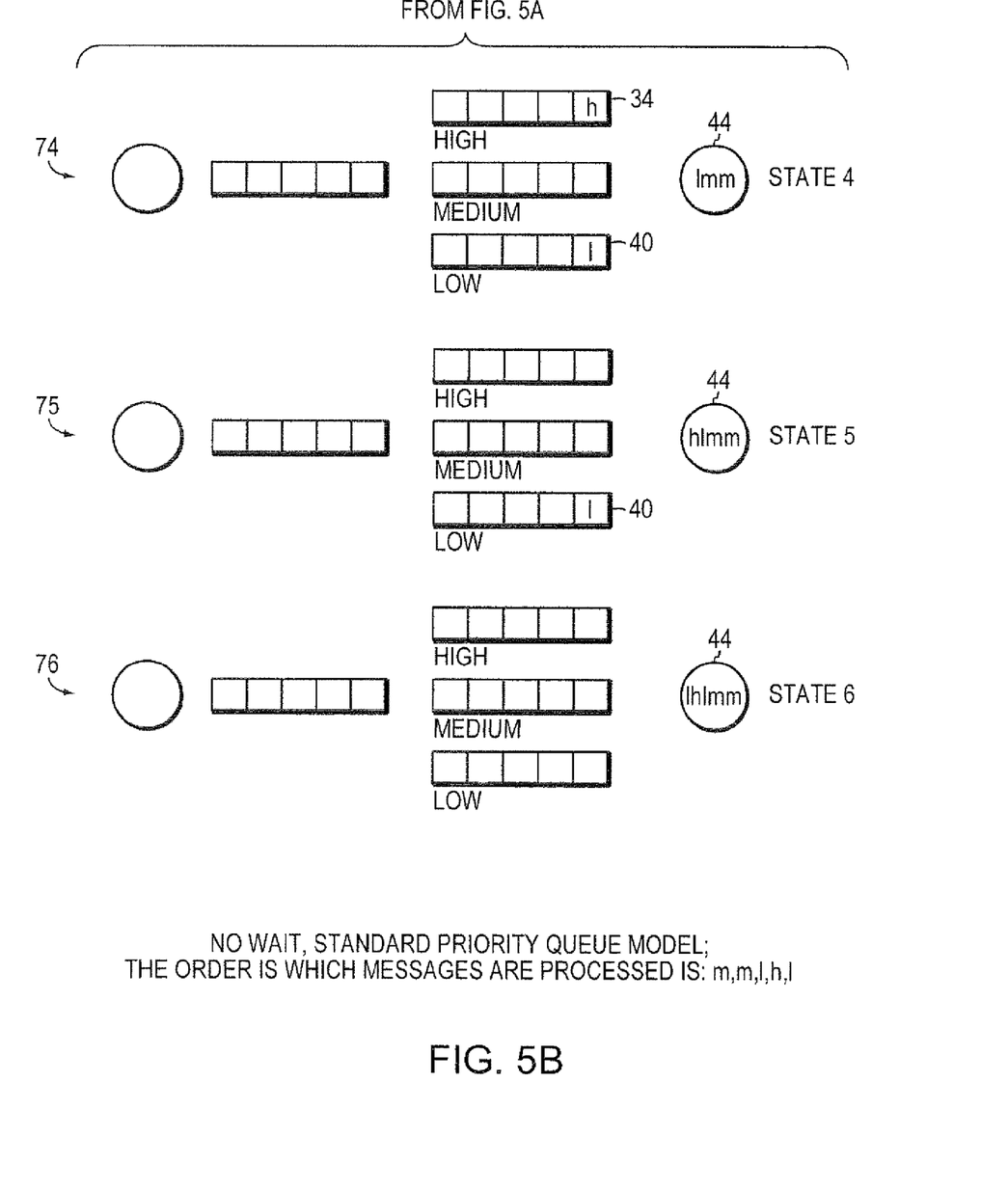

This operation is illustrated in FIG. 5A and FIG. 5B. At state 71, messages "m" and "m" are in medium priority queue 36, and messages "l", "l" and h are in first queue 32. At states 72 and 73, both "m"s are passed from queue 36 to destination 44, and both "l"s are passed from queue 32 to low priority queue 40. At state 74, the "h" message is passed from the high priority queue 34 to the destination 44, and at state 75, the "l" message is passed from queue 40 to destination 44. Thus, with this procedure, the messages are processed in the order "m", "m", "l", "h", "l".

The preferred embodiment of the invention provides a number of significant advantages. One important advantage is the great amount of simplification (and hence correctness) achieved in the logic and translation by using (n+1) queues. A particular advantage of this invention is in the critical role of accurate translation of communication channels to mathematical model in Model Checking real time software correctly.

Included herewith is an Appendix that provides an encoding for a message queue with three priorities and where the size of the FIFO channel is four.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

APPENDIX

```
#define FIFO_SIZE 4
#define message_type {0,1,2,3}
#define EMPTY 0
#define LOW 1
#define MED 2
#define HIGH 3
vmode default {
module queue (push_in, pop_out , data_in) (data_out, top) {
var vector(0..((FIFO_SIZE)-1)): {EMPTY, LOW, MED, HIGH};
--%for i in 1 .. ((FIFO_SIZE)-2) do
%for i in 1 .. 2 do
      assign init(vector(i)) := EMPTY;
      assign next(vector(i)) := case
          pop_out & push_in: if (vector(i) != EMPTY & vector(%{i+1}) = EMPTY) then
data_in
else vector(%{i+1}) endif;
          pop_out : vector(%{i+1});
          push_in : if (vector(i) = EMPTY & vector(%{i-1}) != EMPTY) then data_in
else
vector(i) endif;
          else: vector(i);
      esac;
%end
assign init(vector(0)) := EMPTY;
assign next(vector(0)) := case
      push_in & pop_out:
          if (vector(1) != EMPTY) then vector(1) else data_in endif;
      pop_out : vector(1);
      push_in : if (vector(0) = EMPTY) then data_in else vector(0) endif;
      else:
          vector(0);
esac;
assign init(vector((FIFO_SIZE)-1)) := EMPTY;
assign next(vector((FIFO_SIZE)-1)) := case
      pop_out & push_in: if (vector((FIFO_SIZE)-1) != EMPTY) then data_in else EMPTY
```

APPENDIX-continued

```
            endif;
        pop_out: EMPTY;
        push_in: if (vector((FIFO_SIZE)-2) != EMPTY & vector((FIFO_SIZE)-1) = EMPTY)
then data_in else EMPTY endif;
        else:
                vector((FIFO_SIZE)-1);
esac;
define data_out := if (pop_out) then top else EMPTY endif;
define top := vector(0);
}
module priority_queue (push_in, in_pop_out , data_in) (data_out, top) {
var pop_out:boolean;
assign pop_out := in_pop_out;
instance high_queue: queue(push_in_high, pop_out_high, data_in_high)(data_out_high,
top_high);
instance low_queue: queue(push_in_low, pop_out_low, data_in_low)(data_out_low,
top_low);
instance med_queue: queue(push_in_med, pop_out_med, data_in_med)(data_out_med,
top_med);
instance trans_queue: queue(push_in_trans, pop_out_trans,
data_in_trans)(data_out_trans, top_trans);
var trans_barrier: boolean;
assign trans_barrier:= {true, false};
define push_in_high:= if (trans_barrier) then false else (if (data_out_trans = HIGH)
then true else false endif) endif;
define push_in_med := if (trans_barrier) then false else (if (data_out_trans = MED)
then true else false endif) endif;
define push_in_low:= if (trans_barrier) then false else (if (data_out_trans = LOW)
then true else false endif) endif;
define pop_out_trans := !trans_barrier;
define pop_out_high := if (!pop_out) then false else if (top_high != EMPTY) then true
else false endif endif;
define pop_out_med := if (!pop_out) then false else if (top_high = EMPTY & top_med !=
EMPTY) then true else false endif endif;
define pop_out_low := if (!pop_out) then false else if (top_high = EMPTY & top_med =
EMPTY & top_low != EMPTY) then true else false endif endif;
define data_in_trans := data_in;
define push_in_trans := push_in;
define data_in_high := top_trans;
define data_in_med := top_trans;
define data_in_low := top_trans;
define data_out := if (pop_out) then top else EMPTY endif;
define top := case
            top_high != EMPTY: top_high;
            top_med != EMPTY : top_med;
            top_low != EMPTY : top_low;
        else: EMPTY;
esac;
}
instance check_queue: priority_queue(push_in, pop_out, data_in)(data_out, top);
define push_in := {true, false};
define data_in := {EMPTY, LOW, MED, HIGH};
define pop_out := {true, false};
}
--instance simple_queue: queue(push_in_s, pop_out_s, data_in_s)(data_out_s, top_s);
--define push_in_s := {true, false};
--define data_in_s := {EMPTY, LOW, MED, HIGH};
--define pop_out := {true, false};
vunit abc {
        define h_in := push_in = HIGH;
        define l_in := push_in = LOW;
        define h_out := data_out = HIGH;
        define l_out := data_out = LOW;
        define nothing := !h_out & !l_out;
}
vunit try {
        define h_in := data_in = HIGH & push_in;
        define l_in := data_in = LOW & push_in;
        define m_in := data_in = MEDIUM & push_in;
        define no_in := !push_in;
        define h_out := data_out = HIGH;
        define l_out := data_out = LOW;
        define nothing := !h_out & !l_out;
-- assert{{ (!h_in & !l_in)[*]; h_in }}(false);
        assert{{ (!h_in & !l_in) [*]; h_in; (!h_in & !l_in) [*]; h_in; (!h_in & !l_in)
[*]; l_in; (!h_in & !l_in) [*]} &&
            { (nothing)[*]; h_out ; (nothing)[*]; l_out}}(false);
}
```

What is claimed is:

1. A method of modeling non-deterministic queues for efficient model checking, wherein a multitude of messages are held in a plurality of queues, said messages having n priorities, the method comprising the steps of:
providing (n+1) queues, including a first queue, and n priority queues;
passing, by a processor, said messages from a source to the first queue;
passing each of said messages from the first queue to one of said n priority queues based on the priority of the message;
passing each of said messages from the n priority queues to a destination based on the priority of the message; and
introducing one or more non-deterministic waits into one or more of the passing steps in a manner simplifying passing the messages into or out of the n priority queues, the one or more non-deterministic waits allowing passing of lower priority messages that are in the n priority queues at a given time, passing being from said n priority queues to the destination before an incoming higher priority message enters said n priority queues and allowing passing of said incoming higher priority message once in the n priority queues, said passing of said incoming higher priority message being to the destination before certain lower priority messages are passed to the destination, the certain lower priority messages being ones that were passed to the n priority queues after the given time but prior to the n priority queues receiving said incoming higher priority message.

2. A method according to claim 1, wherein the step of introducing one or more non-deterministic waits includes the step of controlling timing of the passing of messages into the first queue by introducing one non-deterministic wait between the first queue and said n priority queues.

3. A method according to claim 2, wherein the introduced one non-deterministic wait between the first queue and said n priority queues allows passing of lower priority messages from said n priority queues to the destination before said incoming higher priority message enters said n priority queues.

4. A method according to claim 1, wherein the step of introducing one or more non-deterministic waits includes controlling timing of the passing of messages from the n priority queues to the destination by introducing one non-deterministic wait between the n priority queues and the destination.

5. A method according to claim 4, wherein the introduced one non-deterministic wait between the n priority queues and the destination allows passing of higher priority messages from the n priority queues to the destination before lower priority messages that were passed to the n priority queues after the given time but before said incoming higher priority message is received by the n priority queues.

6. A method according to claim 1, wherein the step of providing (n+1) queues includes:
based said (n+1) queues, defining and passing a group of messages from said source to said destination.

7. A method according to claim 6, wherein the step of passing messages from the source to the first queue includes the step of passing all of said defined group of messages from said source to said first queue.

8. A method according to claim 7, wherein the step of passing messages from said first queue to said n priority queues includes the step of passing all of said defined group of messages to said n priority queues.

9. A method according to claim 8, wherein the step of introducing the one or more non-deterministic waits includes the step of introducing one non-deterministic wait between the n priority queues and the destination, wherein said introduced one non-deterministic wait passes said higher priority messages to the n priority queues before said lower priority messages are passed to the destination.

10. A method according to claim 1, wherein the method is used for the translation of communication channels to a mathematical model in Model Checking real time software correctly.

11. A non transitory computer readable program storage media, tangibly embodying a program of instructions executable by a computer to perform method steps for modeling non-deterministic queues for efficient model checking, wherein a multitude of messages are held in a plurality of queues, said messages having n priorities, said method steps comprising:
providing (n+1) queues, including a first queue, and n priority queues;
passing said messages from a source to the first queue;
passing each of said messages from the first queue to one of said n priority queues based on the priority of the message;
passing each of said messages from the n priority queues to a destination based on the priority of the message; and
introducing one or more non-deterministic waits into one or more of the passing steps in a manner that passes the messages into or out of the n priority queues in a predetermined manner, the one or more non-deterministic waits allowing passing of lower priority messages existing in the n priority queues at a given time, passing being from said n priority queues to the destination before an incoming higher priority message enters said n priority queues and allowing passing of said incoming higher priority message once in the n priority queues, said passing of said incoming higher priority message being to the destination before certain lower priority messages are passed to the destination, the certain lower priority messages being ones that were passed to the n priority queues after the given time but prior to the n priority queues receiving said incoming higher priority message.

12. A computer readable program storage media according to claim 11, wherein the step of introducing one or more non-deterministic waits includes the step of controlling timing of the passing of messages into the first queue by introducing one non-deterministic wait between the first queue and said n priority queues.

13. A computer readable program storage media according to claim 11, wherein the step of introducing one or more non-deterministic waits includes the step of controlling timing of the passing of messages from the n priority queues to the destination by introducing one non-deterministic wait between the n priority queues and the destination.

14. A method of queuing messages between a source and a destination, said messages having n priorities, the method comprising the steps of:
holding messages in (n+1) queues between the source and the destination, said (n+1) queues including a first queue, and n priority queues;
passing, by a processor, said messages from the source to the first queue;
passing each of said messages from the first queue to one of said n priority queues based on the priority of the message;
passing each of said messages from the n queues to a destination based on the priority of the message; and simplifying passing the messages into or out of the n priority queues by introducing one or more non-deterministic waits into one or more of the passing steps, the one or more non-deterministic waits effectively passing lower priority messages existing in the n priority queues at a given time, from said n priority queues to the destination before an incoming higher priority message enters said n priority queues and effectively passing said incoming higher priority message, once in the n priority queues, to the destination before certain lower priority messages are passed to the destination, the certain lower priority messages being ones that were passed to the n priority queues after the given time but prior to the n priority queues receiving said incoming higher priority message.

15. A method according to claim 14, wherein the step of introducing one or more non-deterministic waits includes controlling timing of passing of messages into the first queue by introducing one non-deterministic wait between the first queue and said n priority queues.

16. A method according to claim 14, wherein the step of introducing one or more non-deterministic waits includes controlling timing of the passing of messages from the n priority queues to the destination by introducing one non-deterministic wait between the n priority queues and the destination.

* * * * *